(12) United States Patent
Chen et al.

(10) Patent No.: US 12,162,472 B1
(45) Date of Patent: Dec. 10, 2024

(54) REAL-TIME CONTROL METHOD FOR ADDITIONAL YAW MOMENT OF DISTRIBUTED DRIVE ELECTRIC VEHICLE

(71) Applicant: TONGJI UNIVERSITY, Shanghai (CN)

(72) Inventors: Hong Chen, Shanghai (CN); Lin Zhang, Shanghai (CN); Haobo Sun, Shanghai (CN); Hanghang Liu, Shanghai (CN); Wei Pan, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 53 days.

(21) Appl. No.: 18/540,717

(22) Filed: Dec. 14, 2023

(30) Foreign Application Priority Data

Jun. 29, 2023 (CN) .......................... 202310777635.1

(51) Int. Cl.
*B60W 30/02* (2012.01)
(52) U.S. Cl.
CPC ......... *B60W 30/02* (2013.01); *B60W 2520/14* (2013.01); *B60W 2520/26* (2013.01)
(58) Field of Classification Search
CPC ............. B60W 30/02; B60W 2520/14; B60W 2520/26
See application file for complete search history.

(56) References Cited

U.S. PATENT DOCUMENTS

| 11,327,449 B2 * | 5/2022 | Quirynen ............ G05B 13/0275 |
| 2004/0046448 A1 * | 3/2004 | Brown ....................... B60T 8/24 |
| | | 903/910 |
| 2009/0187302 A1 * | 7/2009 | Takenaka ................. B62D 6/04 |
| | | 701/33.8 |

(Continued)

FOREIGN PATENT DOCUMENTS

| CN | 102034013 B | * | 10/2012 | |
| CN | 108501944 A | * | 9/2018 | ............ B60W 30/02 |

(Continued)

OTHER PUBLICATIONS

CN-108501944-A translation (Year: 2018).*

(Continued)

*Primary Examiner* — Kyle T Johnson
(74) *Attorney, Agent, or Firm* — Bochner PLLC; Andrew D. Bochner

(57) ABSTRACT

The present disclosure relates to a real-time control method for an additional yaw moment of a distributed drive electric vehicle, including the following steps: acquiring and inputting a real-time motion state of the distributed drive electric vehicle into a vehicle dynamics model, using a yaw rate and a sideslip angle of the distributed drive electric vehicle as tracking targets to suppress actuation energy, and performing optimization calculation on an additional yaw moment to acquire an amount of the additional yaw moment distributed for each tire; and in the optimization calculation process, a linear expression of the sideslip angle with respect to the additional yaw moment and a linear expression of the yaw (Continued)

rate with respect to the additional yaw moment are constructed, so as to perform search calculation on the additional yaw moment.

7 Claims, 7 Drawing Sheets

(56) References Cited

U.S. PATENT DOCUMENTS

2023/0138305 A1* 5/2023 Kulas .................... B60W 30/02
701/38

FOREIGN PATENT DOCUMENTS

| CN | 111204332 A * | 5/2020 | ............ B60W 30/02 |
| DE | 102021101038 A1 * | 8/2021 | ............ B60K 17/02 |
| EP | 1950116 A1 * | 7/2008 | ............ B60T 8/1755 |
| EP | 2905193 A1 * | 8/2015 | ............ B60L 15/20 |

OTHER PUBLICATIONS

CN-111204332-A translation (Year: 2020).*
DE-102021101038-A1 translation (Year: 2021).*
CN-102034013-B translation (Year: 2012).*

* cited by examiner

REAL-TIME CONTROL METHOD FOR ADDITIONAL YAW MOMENT OF DISTRIBUTED DRIVE ELECTRIC VEHICLE

CROSS REFERENCE TO RELATED APPLICATION

This patent application claims the benefit and priority of Chinese Patent Application No. 202310777635.1 filed with the China National Intellectual Property Administration on Jun. 29, 2023, the disclosure of which is incorporated by reference herein in its entirety as part of the present application.

TECHNICAL FIELD

The present disclosure relates to the field of distributed drive electric vehicle chassis control, and in particular, to a real-time control method for an additional yaw moment of a distributed drive electric vehicle.

BACKGROUND

Driving stability control for electric vehicles is an important performance related to the driving safety of the vehicles. Distributed drive electric vehicles have been widely concerned in the industry for its extremely high control degree of freedom and flexible and efficient control performance. To ensure driving stability of a distributed drive electric vehicle, additional torque control compensation is performed on a four-wheel motor drive torque by tracking a desired additional yaw moment decided by an upper layer controller, so as to achieve the objective of adjusting and controlling the motion state of the vehicle and keeping the driving stability of the vehicle. Therefore, an additional yaw moment decision method for a distributed drive electric vehicle is very important for controlling the stability of the vehicle. However, existing additional yaw moment decision methods for distributed drive electric vehicles have the following problems.

1. Most of the existing yaw moment decision methods calculate a desired additional yaw moment of a vehicle by designing a sliding mode controller, such as patent CN 111959288 B and patent CN 113147422 A. However, the yaw moment decision methods based on a sliding mode theory are essentially designed on the basis of an error tracking-based feedback control method, which obtains an explicit expression of the additional yaw moment based on an error between a desired vehicle state and an actual state. As a result, a decided control input is not an optimal control input for a whole system. Accordingly, it is difficult to ensure an optimal control performance.
2. Most of the existing additional yaw moment optimization decision methods for distributed drive electric vehicles use model predictive control (MPC) to realize optimization decision on the additional yaw moment. Due to the characteristic of MPC receding horizon optimization, it tends to take a long time to solve an MPC-based additional yaw moment optimization problem. Moreover, model complexity also has a large impact on the solving time. For non-linear models, a specific solver is required for solving an MPC optimization problem, which more increases the demand for calculation power and calculation time.

SUMMARY

The objective of the present disclosure is to provide a real-time control method for an additional yaw moment of a distributed drive electric vehicle to overcome the defects in the prior art.

The objective of the present disclosure can be achieved by the following technical solution.

A real-time control method for an additional yaw moment of a distributed drive electric vehicle includes the following steps:

acquiring and inputting a real-time motion state of the distributed drive electric vehicle into a pre-constructed vehicle dynamics model, using a yaw rate and a sideslip angle of the distributed drive electric vehicle as tracking targets to suppress actuation energy, and performing optimization calculation on the additional yaw moment to acquire an amount of the additional yaw moment distributed for each tire of the distributed drive electric vehicle; where in the optimization calculation process, a linear expression of the sideslip angle with respect to the additional yaw moment and a linear expression of the yaw rate with respect to the additional yaw moment are constructed, so as to perform search calculation on the additional yaw moment.

Further, an expression of the vehicle dynamics model is:

$$\dot{x}_1 = g_1(x)$$

$$\dot{x}_2 = g_2(x) + \frac{\Delta M_{zup}}{I_z \gamma_{up}} u$$

$$x = [x_1, x_2]^T = \left[\frac{\beta}{\beta_{up}}, \frac{\gamma}{\gamma_{up}}\right]^T$$

$$g_1(x) = \frac{F_{yf} + F_{yr}}{m V_x \beta_{up}} - \frac{\gamma_{up}}{\beta_{up}} x_2$$

$$g_2(x) = \frac{L_f F_{yf} - L_r F_{yr}}{I_z \gamma_{up}}$$

where $\dot{x}_1$ is a change rate of the sideslip angle, $\dot{x}_2$ is a change rate of the yaw rate, $x_1$ is a normalized sideslip angle, $x_2$ is a normalized yaw rate, both $g_1(x)$ and $g_2(x)$ are intermediate quantities, $\beta_{up}$ is an upper limit value of the sideslip angle, $\gamma_{up}$ is an upper limit value of the yaw rate, $\Delta M_{zup}$ is an upper limit value of the additional yaw moment, $\beta$ represents the sideslip angle, $\gamma$ represents the yaw rate, $F_{yf}$, $F_{yr}$ are lateral forces of front and rear axle tires respectively, m is a weight of the distributed drive electric vehicle, $V_x$ represents a longitudinal velocity, $L_f$, $L_r$ are distances from a mass center of the distributed drive electric vehicle to front and rear axles respectively, and $I_z$ is a rotational inertia of the distributed drive electric vehicle around a Z axis.

Further, the linear expression of the sideslip angle with respect to the additional yaw moment is:

$$x_1(t+h) = x_1(t) + h g_1(x) + \frac{h^2}{2}\left[\frac{\partial g_1(x)}{\partial x_1} g_1(x) + \frac{\partial g_1(x)}{\partial x_2}\left(g_2(x) + \frac{\Delta M_{zup}}{I_z \gamma_{up}} u\right)\right]$$

where $$\frac{\partial g_1(x)}{\partial x_1}, \frac{\partial g_1(x)}{\partial x_2}$$

are partial derivatives of a function $g_1(x)$ with respect to state of the yaw rate and the sideslip angle respectively, $x_1(t+h)$ is a sideslip angle at a time point of t+h, h is a step size, and $x_1(t)$ is a sideslip angle at a time point of t.

Further, the linear expression of the yaw rate with respect to the additional yaw moment is:

$$x_2(t+h) = x_2(t) + h\left[g_2(x) + \frac{\Delta M_{zup}}{I_z \gamma_{up}} u\right]$$

where $x_2(t+h)$ is a yaw rate at a time point of t+h, h is a step size, and $x_2(t)$ is a yaw rate at a time point of t.

Further, an optimization problem of the optimization calculation is:

$$\min J = \frac{1}{2}\Phi_\gamma \|x_2(t+h) - x_{2,ref}\|^2 + \frac{1}{2}\Phi_\beta \|x_1(t+h) - x_{1,ref}\|^2 + \frac{1}{2}\Phi_u \|u\|^2$$

$$\text{s.t. } u_{min} \le u \le u_{max}$$

$$x_{1,ref} = \frac{\beta_{ref}}{\beta_{up}} = 0, x_{2,ref} = \frac{\gamma_{ref}}{\gamma_{up}}$$

where J is an objective function, $\Phi_\gamma$ is a weight coefficient of the yaw rate, $x_2(t+h)$ is a yaw rate at a time point of t+h, h is a step size, $x_{1,ref}$ and $x_{2,ref}$ are intermediate quantities, $\Phi_\beta$ is a weight coefficient of the sideslip angle, $\Phi_u$ is a weight coefficient of the additional yaw moment, u is a control input, namely the additional yaw moment, $\beta_{ref}$ is a desired vehicle sideslip angle, $\gamma_{ref}$ is a desired yaw rate, $u_{min}$ is a minimum value of the additional yaw moment, $u_{max}$ is a maximum value of the additional yaw moment, $\beta_{up}$ is an upper limit value of the sideslip angle, and $\gamma_{up}$ is an upper limit value of the yaw rate.

Further, in the optimization calculation process, the linear expression of the sideslip angle with respect to the additional yaw moment and the linear expression of the yaw rate with respect to the additional yaw moment are substituted into the optimization problem, and a resulting objective function expression is:

$$J = J_1 + J_2 + J_3$$

$$J_1 = \frac{1}{2}\Phi_\gamma \left\| e_2 + hg_2(x) + h\frac{\Delta M_{zup}}{I_z\gamma_{up}}u \right\|^2$$

$$J_2 = \frac{1}{2}\Phi_\beta \left\| x_1(t) + hg_1(x) + \frac{h^2}{2}\left[\frac{\partial g_1(x)}{\partial x_1}g_1(x) + \frac{\partial g_1(x)}{\partial x_2}\left(g_2(x) + \frac{\Delta M_{zup}}{I_z\gamma_{up}}u\right)\right] \right\|^2$$

$$J_3 = \frac{1}{2}\Phi_u \|u\|^2$$

$$e_2 = x_2(t) - x_{2,ref}$$

where $x_2$ is the yaw rate, $x_1(t)$ is a sideslip angle at a time point of t, and $$\frac{\partial g_1(x)}{\partial x_1}, \frac{\partial g_1(x)}{\partial x_2}$$

are partial derivatives of a function $g_1(x)$ with respect to state of the yaw rate and the sideslip angle respectively.

Further, in the optimization calculation process, an optimal solution of the additional yaw moment is calculated by solving an extreme point, an extreme point expression of the objective function is:

$$P_1(x)u + P_2(x) + P_3(x) = 0$$

$$P_1(x) = \Phi_\gamma\left(\frac{h\Delta M_{zup}}{I_z\gamma_{up}}\right)^2 + \Phi_\beta\left(\frac{h^2}{2}\frac{\partial g_1(x)}{\partial x_2}\frac{\Delta M_{zup}}{I_z\gamma_{up}}\right)^2 + \Phi_u$$

$$P_2(x) = \Phi_\gamma \frac{h\Delta M_{zup}}{I_z\gamma_{up}}[e_2 + hg_2(x)]$$

$$P_3(x) =$$

$$\Phi_\beta \frac{h^2}{2}\frac{\partial g_1(x)}{\partial x_2}\frac{\Delta M_{zup}}{I_z\gamma_{up}}\left[x_1(t) + hg_1(x) + \frac{h^2}{2}\left[\frac{\partial g_1(x)}{\partial x_1}g_1(x) + \frac{\partial g_1(x)}{\partial x_2}g_2(x)\right]\right]$$

where $P_1(x)$, $P_2(x)$ and $P_3(x)$ are all intermediate quantities;

an expression of the solved extreme point is:

$$u = -\frac{P_2(x) + P_3(x)}{P_1(x)}$$

the solved extreme point is inversely normalized to obtain an optimal solution of the additional yaw moment, and a calculation expression of the optimal solution is:

$$u^* = u\Delta M_{zup}$$

where $u^*$ is the optimal solution of the additional yaw moment.

Further, the method further includes setting an additional yaw moment range for the optimal solution of the additional yaw moment to obtain an optimal additional yaw moment, where the optimal additional yaw moment is used for distribution of the additional yaw moment of each tire, and a calculation expression of the optimal additional yaw moment is:

$$\Delta M_z^* = \begin{cases} \Delta M_{z_{min}}, & u^* \le \Delta M_{z_{min}} \\ u^* \\ \Delta M_{z_{max}}, & u^* \ge \Delta M_{z_{max}} \end{cases}$$

where $\Delta M_z$ is the optimal additional yaw moment, $\Delta M_{z_{min}}$ is a minimum value of the additional yaw moment, and $\Delta M_{z_{max}}$ is a maximum value of the additional yaw moment.

Further, a distribution expression of the amount of the additional yaw moment distributed for each tire is:

$$\Delta T_{fl} = \Delta T_{rl} = -\frac{\Delta M_z^* R_e}{2d}$$

$$\Delta T_{fr} = \Delta T_{rr} = -\frac{\Delta M_z^* R_e}{2d}$$

where $\Delta T_{fl}$, $\Delta T_{fr}$, $\Delta T_{rl}$ and $\Delta T_{rr}$ are amounts of the additional yaw moment distributed for a front left wheel, a front right wheel, a rear left wheel and a rear right wheel respectively, $R_e$ is a tire rolling radius, and d is a vehicle wheel track.

Further, the solved amount of the additional yaw moment distributed for each tire is transmitted into a layer controller for execution to drive each tire of the distributed drive electric vehicle.

Compared with the prior art, the present disclosure has the following advantages.

In the present disclosure, the state are solved first based on the vehicle dynamics model, and a state function is approximated. A linear expression of the state with respect to the control input is obtained by combining a vehicle differential equation. The optimization problem is finally reconstructed. An explicit expression of the extreme point is solved by means of a state approximate expression, which is the decision result of the optimal additional yaw moment.

The processing process of the solution can better control both tracking of the desired yaw rate and suppression of the sideslip angle, which is comparable to non-linear model predictive control. Moreover, it can be seen from the contrast results of the calculation time that since the additional yaw moment real-time optimization decision method proposed by the present disclosure results in the explicit expression of the optimal additional yaw moment, it takes a short time to calculate, which can meet the requirement for real-time performance.

DETAILED DESCRIPTION OF THE EMBODIMENTS

Figure 1:
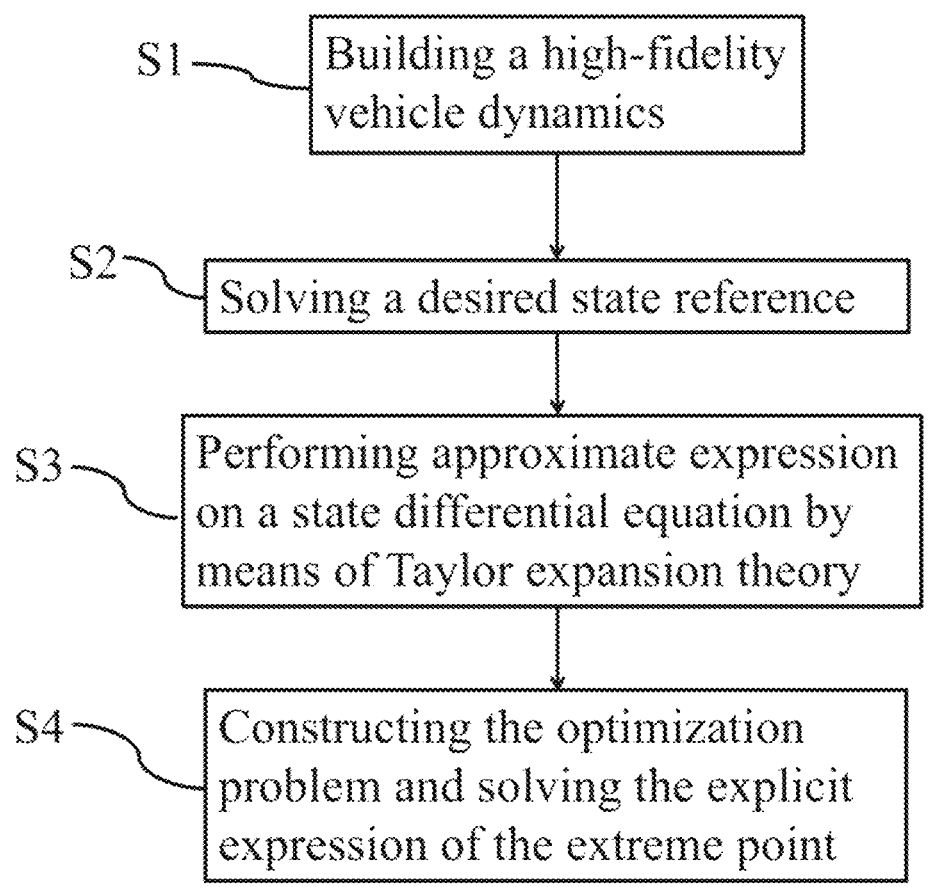
FIG. 1 is a frame diagram of a real-time control method for an additional yaw moment of a distributed drive electric vehicle provided in an embodiment of the present disclosure.

In order to make the objectives, technical solutions, and advantages of the embodiments of the present disclosure clearer, the technical solutions in the embodiments of the present disclosure will be clearly and completely described below in conjunction with the accompanying drawings in the embodiments of the present disclosure. Apparently, the described embodiments are some, rather than all of the embodiments of the present disclosure. Generally, components of the embodiments of the present disclosure described and shown in the accompanying drawings may be arranged and designed in various manners.

Therefore, the following detailed description of the embodiments of the present disclosure in the accompanying drawings is not intended to limit the protection scope of the present disclosure, but merely indicates selected embodiments of the present disclosure. All other embodiments obtained by those of ordinary skill in the art based on the embodiments of the present disclosure without creative efforts should fall within the protection scope of the present disclosure.

It should be noted that similar reference signs and letters represent similar items in the accompanying drawings below. Therefore, once an item is defined in one accompanying drawing, it does not need to be further defined and described in subsequent accompanying drawings.

In the description of the present disclosure, it should be noted that orientations or position relationships indicated by terms "center", "upper", "lower", "left", "right", "vertical", "horizontal", "inner", "outer", etc. are orientations or position relationships shown in the accompanying drawings, or orientations or position relationships in which a product of the present disclosure is customarily placed when being used, and these terms are only used to facilitate description of the present disclosure and simplify the description, but not to indicate or imply that the mentioned apparatus or components must have a specific orientation or must be established and operated in a specific orientation, and thus these terms cannot be understood as a limitation to the present disclosure.

It should be noted that terms "first" and "second" are used only for descriptive purposes, and should not be construed as indicating or implying relative importance or implying the number of indicated technical features. Thus, features defined with "first" and "second" may explicitly or implicitly include one or more of the features. In the description of the present application, "multiple" means two or more, unless otherwise specifically defined.

Moreover, terms such as "horizontal" and "vertical" do not mean that a component is absolutely horizontal or overhanging, but that it can be tilted slightly. If "horizontal" only means that a direction of the component is more horizontal than "vertical", it does not mean that the structure must be completely horizontal, but that it can be tilted slightly.

Embodiment 1

The embodiment provides a real-time control method for an additional yaw moment of a distributed drive electric vehicle, including the following steps:

acquiring and inputting a real-time motion state of the distributed drive electric vehicle into a pre-constructed vehicle dynamics model, using a yaw rate and a sideslip angle of the distributed drive electric vehicle as tracking targets to suppress actuation energy, and performing optimization calculation on an additional yaw moment to acquire an amount of the additional yaw moment distributed for each tire.

In the optimization calculation process, a linear expression of the sideslip angle with respect to the additional yaw moment and a linear expression of the yaw rate with respect to the additional yaw moment are constructed, so as to perform search calculation on the additional yaw moment.

Specifically, the above solution is divided into three parts. In the first part, a desired state is solved based on a vehicle second-order reference model. In the second part, based on knowledge of a vehicle dynamics mechanism, a state function is approximated by means of Taylor expansion theory, and a linear expression of the state with respect to a control input is obtained by combining a vehicle differential equation. In the third part, an optimization problem is constructed, an explicit expression of an extreme point is solved by means of a state approximate expression, which is a decision result of an optimal additional yaw moment. An optimal real-time decision of the additional yaw moment can be realized by constructing an explicit solution of the optimal additional yaw moment.

Preferably, in the embodiment, in order to verify the effectiveness of the method according to the present disclosure, a simulation condition is designed for verification in contrast with a traditional algorithm. The simulation condition is selected for vehicle driving stability under a low-adhesion road, and the algorithm for contrast is a model predictive control-based additional yaw moment decision method.

The above solution specifically includes the following steps.

At step S1, a high-fidelity vehicle dynamics model is built.

A vehicle model is selected from Carsim dynamics simulation software. A vehicle parameter is configured. An input-output variable interface is defined. A real-time control algorithm for additional yaw moment is built based on MATLAB/Simulink. An algorithm input is a real-time motion state of the distributed drive electric vehicle from the Carsim dynamics simulation software. An algorithm output is sent into a vehicle control input interface in the Carsim dynamics simulation software. The simulation condition for the vehicle driving stability under the low-adhesion road is built based on the selected vehicle model and parameter, and the effectiveness of the present disclosure is verified through simulation.

At step S2, a desired state reference is solved.

For a problem of handling stability control for the distributed drive electric vehicle, a second-order reference model is used to solve the desired state reference:

$$\frac{x_{ref}}{\delta_f} = H(s) \quad (1)$$

where $\delta_f$ is a front wheel rotation angle, and $H(s)$ is a transfer function from the front wheel rotation angle to a vehicle desired state reference.

In the driving process of the vehicle, tire forces are limited by a road adhesion limit. Therefore, when the desired state reference is calculated, it is necessary to limit the tire forces to a certain extent to adapt to the road adhesion limit. An upper limit of the desired state reference is defined as $Y_{ref_up}$, and thus a desired state constraint is:

$$|Y_{ref}| \le Y_{ref_up} \quad (2)$$

At step S3, approximate expression is performed on a state differential equation by means of Taylor expansion theory.

It specifically includes the following steps.

At step S3.1, a vehicle dynamics equation is constructed.

$$\dot{x} = g(x,u) \quad (3)$$

where x is a system state, which is a multi-dimensional vector with dimensions consistent with degrees of freedom of the vehicle dynamics model, u is a control input, which is the additional yaw moment in the present disclosure, and u is a function relationship representation symbol.

At step S3.2, a tire model is constructed.

$$F_x = f_x(x, \delta_f, L_f, L_r)$$

$$F_y = f_y(x, \delta_f, L_f, L_r) \quad (4)$$

where $f_x$, $f_y$ are both function relationship representation symbols.

At step S3.3, a vehicle state function is approximated by means of Taylor expansion theory.

It can be seen from analysis of the vehicle dynamics equation that a vehicle state is a non-linear differential equation expression with respect to the control input, thus causing a problem of difficulty in solving the optimization problem. In order to solve an explicit solution of the optimization problem, an approximate step size is selected ash, at a current point oft, the state is subjected to Taylor expansion in different orders, and the orders are selected in such a way that linear expression with respect to the control input can be obtained.

The vehicle state function is subjected to Taylor expansion approximation by combining the vehicle dynamics differential equation (3) to obtain a linear expression of the state with respect to the control input:

$$x(t+h) = G(x(t)) + Ku(t) \quad (5)$$

where K is a coefficient vector, t represents a current point, and G is a function relationship representation symbol.

At step S4, the optimization problem is constructed, and the explicit expression of the extreme point is solved.

It specifically includes the following steps.

At step S4.1, an objective function of the optimization problem is constructed.

In the research of vehicle driving stability control, the construction of the objective function usually considers the tracking of the desired state and the suppression of the actuation energy. Therefore, the constructed objective function is as follows:

$$J = \frac{1}{2}\Phi_1 \|x(t+h) - x_{ref}\|^2 + \frac{1}{2}\Phi_2 \|u(t)\|^2 \quad (6)$$

where $x_{ref}$ is a state reference, and $\Phi_1$, $\Phi_2$ are both weight coefficients of the state and the control input.

At step S4.2, a Taylor expansion approximate expression of the state is substituted into the objective function.

Formula (5) is substituted into Formula (6) to obtain an objective function expression only containing a to-be-optimized variable u(t):

$$J = \frac{1}{2}\Phi_1 \|G(x(t)) + Ku(t) - x_{ref}\|^2 + \frac{1}{2}\Phi_2 \|u(t)\|^2 \quad (7)$$

At step S4.3, the explicit expression of the extreme point is solved.

It can be seen from analysis of Formula (7) that the objective function is a quadratic function with respect to the to-be-optimized variable u(t). Therefore, the extreme point of the objective function is an optimal solution of the to-be-optimized variable.

Let $$\frac{\partial J}{\partial u} = 0 \quad (8)$$

The optimal solution of the to-be-optimized variable is obtained as $$u^*(t) = -\Phi_1(\Phi_1 K + \Phi_2)^{-1}[G(x(t)) - x_{ref}]^T \quad (9)$$

In practical application, after the explicit solution of the control input is obtained, upper and lower limits of constraints of the control input also need to be considered. The range of the additional yaw moment is set as $[\Delta M_{z_{min}}, \Delta M_{z_{max}}]$, and thus the optimal additional yaw moment is:

$$\Delta M_z^* = \begin{cases} \Delta M_{z_{min}}, & u^* \leq \Delta M_{z_{min}} \\ u^* \\ \Delta M_{z_{max}}, & u^* \geq \Delta M_{z_{max}} \end{cases} \quad (10)$$

After obtained, the optimal additional yaw moment can be transmitted into a lower layer controller for execution. By distributing the additional yaw moment in a suitable manner, four-wheel additional torque is obtained, and then the stability control for the distributed drive electric vehicle can be realized.

The specific implementation process of the above solution is introduced below with an example.

A frame diagram of an additional yaw moment real-time optimization decision method according to the example is shown in FIG. 1. A desired vehicle state reference calculation module receives a front wheel rotation angle input $\delta_f$ from a driver. Then, a desired state reference value $x_{ref}$ of the vehicle is calculated according to a two-degree-of-freedom vehicle reference model. The reference value is sent into a real-time optimal additional yaw moment decision module. In the real-time optimal additional yaw moment decision module, first, vehicle and tire models are constructed. Then, a state function is approximated based on Taylor expansion theory. At the same time, a linear expression of a state with respect to a control input is obtained by combining a vehicle dynamics differential equation. Next, an optimized objective function is constructed according to a vehicle driving stability demand, and an approximated state differential equation is substituted therein to obtain a quadratic function with respect to the control input. Finally, an explicit expression of an optimal additional yaw moment is obtained based on an extreme theorem. The decided additional yaw moment has the explicit expression, and thus the requirement for the real-time performance of calculation can be met.

The additional yaw moment real-time optimization decision method according to the example is realized and verified by means of joint simulation of software systems. The specific process is as follows:

1. Software Selection

Writing of an additional yaw moment real-time optimization decision algorithm proposed by the present disclosure and construction of a plant of a simulation model are respectively realized by means of software Matlab/Simulink with a version of Matlab R2020a and high-fidelity vehicle dynamics simulation software CarSim with a version of CarSim2019.1. Matlab/Simulink is configured to build the additional yaw moment real-time optimization decision algorithm. Program implementation of the additional yaw moment real-time optimization decision algorithm is completed by performing modular programming in simulink. CarSim mainly acts to provide a high-fidelity vehicle dynamics model and a corresponding simulation condition, and in a simulation experiment, the model replaces a real vehicle to serve as an implementation object of the designed additional yaw moment real-time optimization decision algorithm.

2. Joint Simulation Setting

In order to realize joint simulation of the two pieces of software, first, an input-output interface module of Carsim is configured, and a simulink model path is added to the Carsim software to realize joint communication. Then, Carsim is compiled, and a corresponding S-Function module is generated in simulink. Finally, parameter configuration is performed on S-Function, and an input-output signal interface is led out. A joint simulation step size is set as 0.001 s. When a Simulink simulation model runs, a CarSim model also performs calculation and solving at the same time. In the process of simulation, data is exchanged continuously between the Simulink simulation model and the CarSim model. If a model structure or parameter setting in CarSim is amended, CarSim needs to be recompiled. Then, a S-Function module needs to regenerated to update Carsim software configuration information.

In order to verify the effectiveness of the additional yaw moment real-time optimization decision method according to the present disclosure, the present disclosure selects vehicle stability control under a low-adhesion road for method verification. First, a MATLAB/Simulink and Carsim high-fidelity dynamics software-based joint simulation software platform is built, and selection and parameter configuration of a vehicle model are performed. Then, the additional yaw moment real-time optimization decision algorithm is built in MATLAB/Simulink, and an input-output interface is defined to meet the requirement of joint simulation. Finally, a low-adhesion road vehicle stability control test condition is set in Carsim to verify the method according to the present disclosure. At the same time, it is compared with a model predictive control-based additional yaw moment decision method to illustrate the beneficial effects of the present disclosure.

The additional yaw moment real-time optimization decision method according to the present disclosure specifically includes the following steps.

At step S1, a high-fidelity vehicle dynamics model is built.

The high-fidelity vehicle dynamics model is configured to simulate a real plant, namely a distributed drive electric vehicle in the present disclosure, and the high-fidelity vehicle dynamics model constructed herein mainly simulates yawing motion and lateral motion of the real vehicle.

In Carsim, a passenger vehicle model is selected first and then subjected to parameter configuration. The present disclosure focuses on the additional yaw moment real-time optimization decision method and thus focuses on important vehicle and tire parameters, such as a vehicle weight, distances from a vehicle mass content to front and rear axles, and tire cornering stiffness. Then, a vehicle driving condition is configured, which mainly includes testing a condition route, road adhesion condition, etc. The vehicle driving route is realized by control of a self-contained driver model of Carsim, and the driver model outputs a front wheel rotation angle $\delta_f$. After the additional yaw moment is decided, the additional yaw moment is distributed by a method of equal distribution to obtain four-wheel additional torque. Finally, the input-output interface of Carsim is configured, with an input interface inputting the four-wheel additional torque and an output interface outputting important vehicle state information and the like. After the above configuration is completed, Carsim is added into simulink in a S-Function manner, and matching of the algorithm and the input-output interface of a Carsim module is completed.

At step S2, desired state is solved.

For a problem of vehicle driving stability control, a yaw rate and a sideslip angle of the distributed drive electric vehicle are usually selected as tracking objectives. For the yaw rate, a desired yaw rate reference value is calculated by using a widely used vehicle second-order reference model. In the reference model, a desired state is calculated according to a current vehicle front wheel rotation angle $\delta_f$ and a corresponding transfer function, where the transfer function from the front wheel rotation angle $\delta_f$ to the desired vehicle yaw rate $\gamma_{ref}$ is $$\frac{\gamma_{ref}}{\delta_f} = K_\gamma \frac{1 + \tau_\gamma s}{\frac{1}{\omega_n^2}s^2 + \frac{2\zeta}{\omega_n}s + 1} \tag{11}$$

where a vehicle stability factor is $$K = -\frac{m(C_f L_f - C_r L_r)}{L^2 C_f C_r} \tag{12}$$

In the above formula, $L=L_f+L_r$ represents a vehicle axle. System natural frequency is:

$$w_n = \frac{L}{V_x}\sqrt{\frac{C_f C_r (1 + KV_x^2)}{mI_z}} \tag{13}$$

A system damping coefficient is:

$$\zeta = \frac{m(C_f L_f^2 + C_r L_r^2) + (C_f + C_r)I_z}{2L\sqrt{mI_z C_f C_r (1 + KV_x^2)}} \tag{14}$$

A steady-state gain of the yaw rate is $$K_\gamma = \frac{V_x}{L(1 + KV_x^2)} \tag{15}$$

A yaw rate differential coefficient $$\tau_\gamma = \frac{mV_x L_f}{C_r L} \tag{16}$$

In the driving process of the vehicle, tire forces are limited by a road adhesion limit. Therefore, when a desired yaw rate reference is calculated, it is necessary to limit the tire forces to a certain extent to adapt to the road adhesion limit. An upper limit of the desired yaw rate reference is defined as $\gamma_{up}$, and thus $$\gamma_{up} = \left|\frac{\mu g}{V_x}\right| \tag{17}$$

A yaw rate reference value needs to be limited within a boundary range, namely:

$$|\gamma_{ref}| \leq \gamma_{up} \tag{18}$$

For a desired vehicle sideslip angle reference, the sideslip angle represents a lateral motion ability of the vehicle, the larger the sideslip angle is, the more violent the lateral motion of the vehicle is, and the greater the possibilities of vehicle destabilization and drifting are. Therefore, the desired vehicle sideslip angle reference is usually set as zero, namely:

$$\beta_{ref} = 0 \tag{19}$$

Similarly, considering the limitation of the tire adhesion limit to the sideslip angle, an upper limit value $\beta_{up}$ of the sideslip angle is $$\beta_{up} = \left|\mu g \left(\frac{L_r}{V_x^2} + \frac{3}{2}\frac{mL_f}{C_r L}\right)\right| \tag{20}$$

At step S3, approximate expression is performed on a state differential equation by means of Taylor expansion theory.

It specifically includes the following steps.

At step S3.1, a vehicle dynamics equation is constructed.

In the embodiment, lateral motion and yawing motion of the vehicle are described by means of a two-degree-of-freedom vehicle model. It is worth noting that since an approximate step size selected by Taylor expansion theory is usually small, it can be considered that a longitudinal velocity of the vehicle remains unchanged within the approximate step size, at which point the longitudinal velocity of the vehicle will be introduced into the model as a variable parameter and updated in each approximate calculation.

Figure 2:
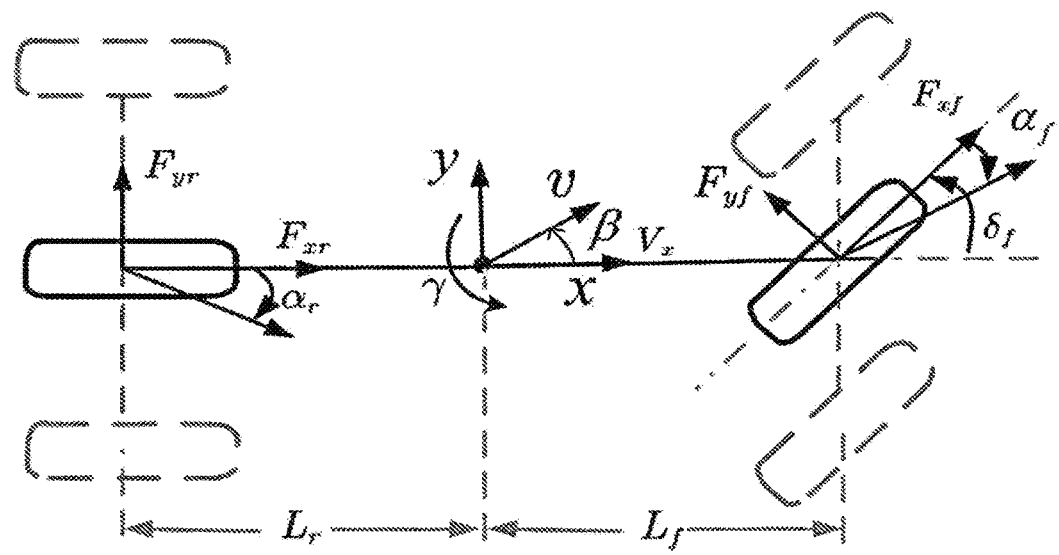
FIG. 2 is a schematic diagram of a two-degree-of-freedom vehicle model provided in an embodiment of the present disclosure.

The two-degree-of-freedom vehicle model is shown in FIG. 2. In the schematic diagram of the model, $F_{yf}$, $F_{yr}$ are lateral forces of front and rear axle tires respectively; $F_{xf}$, $F_{xr}$ are longitudinal forces of the front and rear axle tires respectively; $\alpha_f$, $\alpha_r$ are slip angles of the front and rear axle tires respectively; $L_f$, $L_r$ are distances from the mass center of the distributed drive electric vehicle to front and rear axles respectively; m is a weight of the distributed drive electric vehicle; $I_z$ is a rotational inertia of the distributed drive electric vehicle around a Z axis; $V_x$ represents a longitudinal velocity; $\beta$ represents a sideslip angle; $\gamma$ represents a yaw rate; and $\delta_f$ represents a front wheel rotation angle.

The two-degree-of-freedom vehicle model built according to FIG. 2 is:

$$\begin{aligned}\frac{\dot{\beta}}{\beta_{up}} &= \frac{F_{yf} + F_{yr}}{mV_x \beta_{up}} - \frac{\gamma}{\beta_{up}} \\ \frac{\dot{\gamma}}{\gamma_{up}} &= \frac{L_f F_{yf} - L_r F_{yr}}{I_z \gamma_{up}} + \frac{\Delta M_{zup}}{I_z \gamma_{up}}\frac{\Delta M_z}{\Delta M_{zup}}\end{aligned} \tag{21}$$

where $\beta_{up}$ is an upper limit value of the sideslip angle, $\gamma_{up}$ is an upper limit value of the yaw rate, and $\Delta M_{zup}$ is an upper limit value of the additional yaw moment. Such quantities are introduced for the purpose of normalizing the state and the control input, both of which are regarded as known quantities in the present disclosure.

At step S3.2, a tire model is constructed.

In order to improve the accuracy of the model, the lateral forces of the front and rear axle tires are described herein by means of a Fiala brush model, which is a non-linear model and can effectively improve the estimation accuracy of tire forces as compared with a linear model. In the model, the tire slip angles are used as internal variables. When the tire slip angles α are very small, it comes out tan α≈α, after which the tire model can be approximated as:

$$F_y = \begin{cases} -C_\alpha \alpha + \dfrac{C_\alpha^2}{3\mu F_z}|\alpha|\alpha - \dfrac{1}{3}\dfrac{C_\alpha^3}{(3\mu_z F_z)^2}\alpha^3, & |\alpha| < \arctan\left(\dfrac{3\mu F_z}{C_\alpha}\right) \\ -\mu F_z \operatorname{sgn}\alpha, & \text{otherwise} \end{cases} \quad (22)$$

where μ is a road adhesion coefficient, $F_z$ is a vertical load, and $C_\alpha$ is tire cornering stiffness. In order to distinguish front and rear wheels, cornering stiffness of the front wheel is donated as $C_f$, and cornering stiffness of the rear wheel is donated as $C_r$.

The slip angles of the tires are calculated by the following formula:

$$\alpha_f = \beta + \frac{L_f}{V_x}\gamma - \delta_f \quad (23)$$

$$\alpha_r = \beta - \frac{L_r}{V_x}\gamma$$

At step S3.3, a vehicle state function is approximated by means of Taylor expansion theory.

For ease of derivation, the vehicle dynamics equation in Formula (21) is rewritten as the following form:

$$\dot{x}_1 = g_1(x) \quad (24)$$

$$\dot{x}_2 = g_2(x) + \frac{\Delta M_{zup}}{I_z \gamma_{up}}u$$

$$x = [x_1, x_2]^T = \left[\frac{\beta}{\beta_{up}}, \frac{\gamma}{\gamma_{up}}\right]^T \quad (25)$$

$$g_1(x) = \frac{F_{yf} + F_{yr}}{mV_x \beta_{up}} - \frac{\gamma_{up}}{\beta_{up}}x_2$$

$$g_2(x) = \frac{L_f F_{yf} - L_r F_{yr}}{I_z \gamma_{up}}$$

In order to solve an explicit solution of the optimization problem, an approximate step size is selected as h, the state function is subjected to Taylor expansion in different orders, and the orders are selected in such a way that linear expression of the state with respect to the control input can be obtained.

Second-order Taylor expansion is performed on a sideslip angle function $x_1(t)$ to combine with the vehicle dynamics differential equation (21) to obtain linear expression of the sideslip angle with respect to the control input of the additional yaw moment:

$$x_1(t+h) = x_1(t) + h\dot{x}_1(t) + \frac{h^2}{2}\ddot{x}_1(t) = \quad (26)$$

$$x_1(t) + hg_1(x) + \frac{h^2}{2}\left[\frac{\partial g_1(x)}{\partial x_1}g_1(x) + \frac{\partial g_1(x)}{\partial x_2}\left(g_2(x) + \frac{\Delta M_{zup}}{I_z \gamma_{up}}u\right)\right]$$

where $$\frac{\partial g_1(x)}{\partial x_1}, \frac{\partial g_1(x)}{\partial x_2}$$

are partial derivatives of a function $g_1(x)$ with respect to the state of the yaw rate and the sideslip angle respectively, a solution formula of which is as follows $$\frac{\partial g_1(x)}{\partial x_1} = \frac{1}{mV_x}\left(\frac{\partial F_{yf}}{\partial \alpha_f} \cdot \frac{\partial \alpha_f}{\partial x_1} + \frac{\partial F_{yr}}{\partial \alpha_r} \cdot \frac{\partial \alpha_r}{\partial x_1}\right) \quad (27)$$

$$\frac{\partial g_1(x)}{\partial x_2} = \frac{1}{mV_x}\left(\frac{\partial F_{yf}}{\partial \alpha_f} \cdot \frac{\partial \alpha_f}{\partial x_2} + \frac{\partial F_{yr}}{\partial \alpha_r} \cdot \frac{\partial \alpha_r}{\partial x_2}\right)$$

$$\frac{\partial \alpha_f}{\partial x_1} = \frac{\partial \alpha_r}{\partial x_1} = \beta_{up}, \frac{\partial \alpha_f}{\partial x_2} = \frac{L_f}{V_x}\gamma_{up}, \frac{\partial \alpha_r}{\partial x_2} = -\frac{L_r}{V_x}\gamma_{up}$$

where $$\frac{\partial F_y}{\partial \alpha}$$

represents a derivative of the lateral forces of the tires with respect to the slip angles of the tires, which is determined by Formula (22).

First-order Taylor expansion is performed on a yaw rate function $x_2(t)$ to simultaneously combine with the vehicle dynamics differential equation (21) obtain linear expression of the yaw rate with respect to the control input of the additional yaw moment:

$$x_2(t+h) = x_2(t) + h\dot{x}_2(t) = x_2(t) + h\left[g_2(x) + \frac{\Delta M_{zup}}{I_z \gamma_{up}}u\right] \quad (28)$$

At step S4, the optimization problem is constructed, and the explicit expression of the extreme point is solved.

It specifically includes the following steps.

At step S4.1, an objective function of the optimization problem is constructed.

In the additional yaw moment real-time optimization decision method according to the present disclosure, when the objective function is set, tracking of a desired yaw rate reference value and a desired sideslip angle reference value and suppression of actuation energy are considered, and the optimization problem is thus constructed as:

$$\min J = \frac{1}{2}\Phi_\gamma \|x_2(t+h) - x_{2,ref}\|^2 + \frac{1}{2}\Phi_\beta \|x_1(t+h) - x_{1,ref}\|^2 + \frac{1}{2}\Phi\|u\|^2 \quad (29)$$

s.t. $u_{min} \leq u \leq u_{max}$ where $x_{1,ref} = \dfrac{\beta_{ref}}{\beta_{up}} = 0, x_{2,ref} = \dfrac{\gamma_{ref}}{\gamma_{up}}$ (30)

At step S4.2, a Taylor expansion approximate expression of the state is substituted into the objective function.

Formula (26) to Formula (28) are substituted into the objective function (29), coming out $$J_1 = \frac{1}{2}\Phi_Y \|x_2(t+h) - x_{2,ref}\|^2 = \frac{1}{2}\Phi_Y \left\| e_2 + hg_2(x) + h\frac{\Delta M_{zup}}{I_z \gamma_{up}} u \right\|^2 \quad (31)$$

$$J_2 = \frac{1}{2}\Phi_\beta \|x_1(t+h)\|^2 = \tag{32}$$

$$\frac{1}{2}\Phi_\beta \left\| x_1(t) + hg_1(x) + \frac{h^2}{2}\left[ \frac{\partial g_1(x)}{\partial x_1} g_1(x) + \frac{\partial g_1(x)}{\partial x_2}\left( g_2(x) + \frac{\Delta M_{zup}}{I_z \gamma_{up}} u \right) \right] \right\|^2$$

$$J_3 = \frac{1}{2}\Phi_u \|u\|^2 \tag{33}$$

where $e_2 = x_2 - x_{2,ref}$.

Therefore, an objective function expression is $$J = J_1 + J_2 + J_3 \tag{34}$$

At step S4.3, the explicit expression of the extreme point is solved.

It can be seen from analysis of Formula (31) to Formula (34) that the objective function is a quadratic function with respect to a to-be-optimized variable u. Therefore, the extreme point of the objective function is an optimal solution of the to-be-optimized variable.

$$\frac{\partial J}{\partial u} = 0 \tag{35}$$

an expression of the extreme point is obtained as:

$$P_1(x)u + P_2(x) + P_3(x) = 0 \tag{36}$$

Where $$P_1(x) + P_2(x) + P_3(x) = 0 \tag{36}$$

Where $$P_1(x) = \Phi_Y \left( \frac{h\Delta M_{zup}}{I_z \gamma_{up}} \right)^2 + \Phi_\beta \left( \frac{h^2}{2} \frac{\partial g_1(x)}{\partial x_2} \frac{\Delta M_{zup}}{I_z \gamma_{up}} \right)^2 + \Phi_u$$

$$P_2(x) = \Phi_Y \frac{h\Delta M_{zup}}{I_z \gamma_{up}} [e_2 + hg_2(x)]$$

$$P_3(x) = \tag{37}$$

$$\Phi_\beta \frac{h^2}{2} \frac{\partial g_1(x)}{\partial x_2} \frac{\Delta M_{zup}}{I_z \gamma_{up}} \left[ x_1(t) + hg_1(x) + \frac{h^2}{2}\left[ \frac{\partial g_1(x)}{\partial x_1} g_1(x) + \frac{\partial g_1(x)}{\partial x_2} g_2(x) \right] \right]$$

Formula (36) is solved to obtain an expression of the extreme point as $$u = -\frac{P_2(x) + P_3(x)}{P_1(x)} \tag{38}$$

The control input is inversely normalized, coming out $$u^* = u\Delta M_{zup} \tag{39}$$

In practical application, after the explicit solution of the control input of the additional yaw moment is obtained, upper and lower limits of constraints of the control input also need to be considered. The range of the additional yaw moment is set as $[\Delta M_{min}\ \Delta M_{max}]$, and thus the final optimal additional yaw moment is:

$$\Delta M_z^* = \begin{cases} \Delta M_{z_{min}}, & u^* \leq \Delta M_{z_{min}} \\ u^* \\ \Delta M_{z_{max}}, & u^* \geq \Delta M_{z_{max}} \end{cases} \tag{40}$$

After obtained, the optimal additional yaw moment can be transmitted into a lower layer controller for execution. For example, the additional yaw moment is distributed by a method of equal distribution, a formula of which is as follows:

$$\Delta T_{fl} = \Delta T_{rl} = -\frac{\Delta M_z^* R_e}{2d} \tag{41}$$

$$\Delta T_{fr} = \Delta T_{rr} = \frac{\Delta M_z^* R_e}{2d}$$

where fl, fr, rl, rr represent a front left wheel, a front right wheel, a rear left wheel and a rear right represent respectively, $R_e$ is a tire rolling radius, and d is a vehicle wheel track.

In order to verify the effectiveness of the additional yaw moment real-time optimization decision method according to the present disclosure, vehicle stability control under a low-adhesion road is selected for method verification.

The contrast method used in the simulation process is a model predictive control-based additional yaw moment decision method. In the contrast method, the vehicle model and the tire model used keep consistent with those used in the embodiment of the present disclosure, so as to ensure the effectiveness of a contrast experiment. Since the tire model used in the embodiment is a non-linear tire model, the constructed model predictive control-based additional yaw moment decision method is a non-linear control method and requires a specific solver for solving. In the simulation process, the problem of non-linear model predictive control is solved by a Casadi non-linear solver.

The parameters of the vehicle model used in the simulation include a rotational inertia of the distributed drive electric vehicle around a Z axis $I_z = 2059.2$ kg·m², a vehicle weight m=1430 kg, a distance from a mass center of the distributed drive electric vehicle to a front axle $L_f = 1.05$ m, a distance of the mass center of the distributed drive electric vehicle to a rear axle $L_r = 1.61$ m, cornering stiffness of a front tire $C_f = 43082$ N/rad, cornering stiffness of a rear tire $C_r = 59950$ N/rad, and a vehicle wheel track d=1.55 m. In the setting of a low-adhesion road condition, a road adhesion coefficient is μ=0.35, and a vehicle driving condition is a double lane change condition. For the developed additional yaw moment real-time optimization decision algorithm, an approximate step size is selected as h=0.01, a yaw rate tracking weight is selected as $\Phi_Y = 500$, a sideslip angle suppression weight is selected as $\Phi_\beta = 0.01$, an actuation energy suppression weight is selected as $\Phi_u = 2$, and an upper limit of the additional yaw moment is selected as $\Delta M_{zup} = 5000$ Nm.

In a simulation test, the vehicle is driven according to the double lane change condition, and the vehicle velocity is 70 km/h and remains unchanged in the driving process. The rotation angle of a vehicle steering wheel is realized by the self-contained driver model of Carsim. The optimal additional yaw moment is obtained by the additional yaw moment real-time optimization decision method, and then the four-wheel additional torque is obtained by the method of equal distribution and applied to the high-fidelity vehicle dynamics model. The simulation results are shown in the accompanying drawings.

Figure 3:
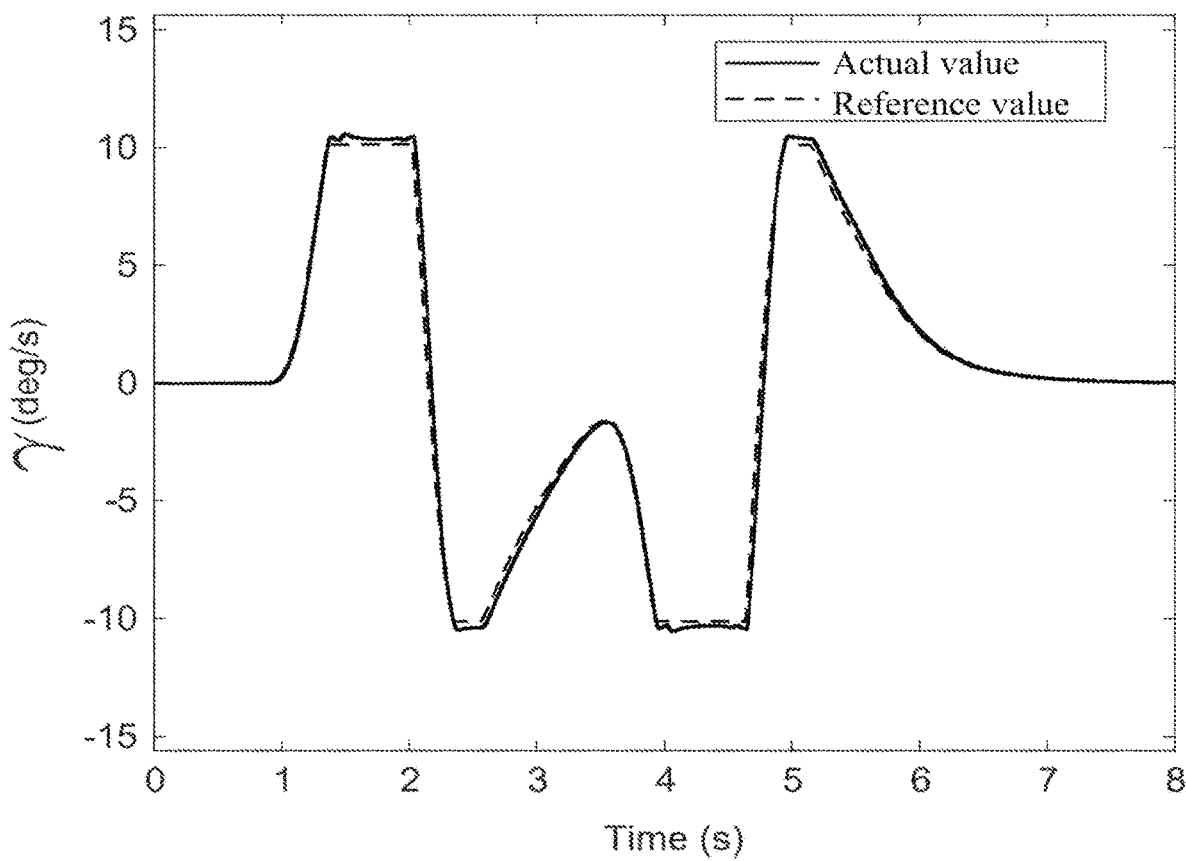
FIG. 3 is a schematic curve diagram of a vehicle yaw rate under a solution of the present disclosure in a simulation process provided in an embodiment of the present disclosure.
Figure 4:
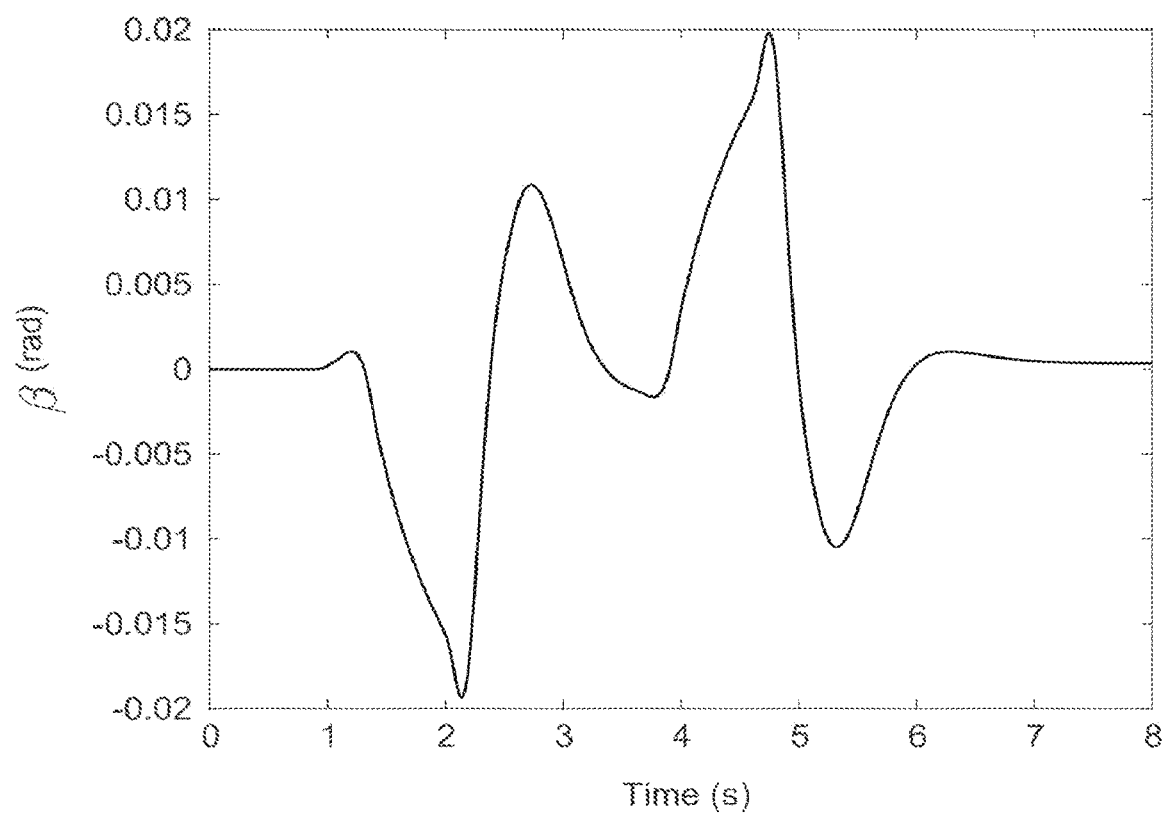
FIG. 4 is a schematic curve diagram of a vehicle sideslip angle under a solution of the present disclosure in a simulation process provided in an embodiment of the present disclosure.
Figure 5:
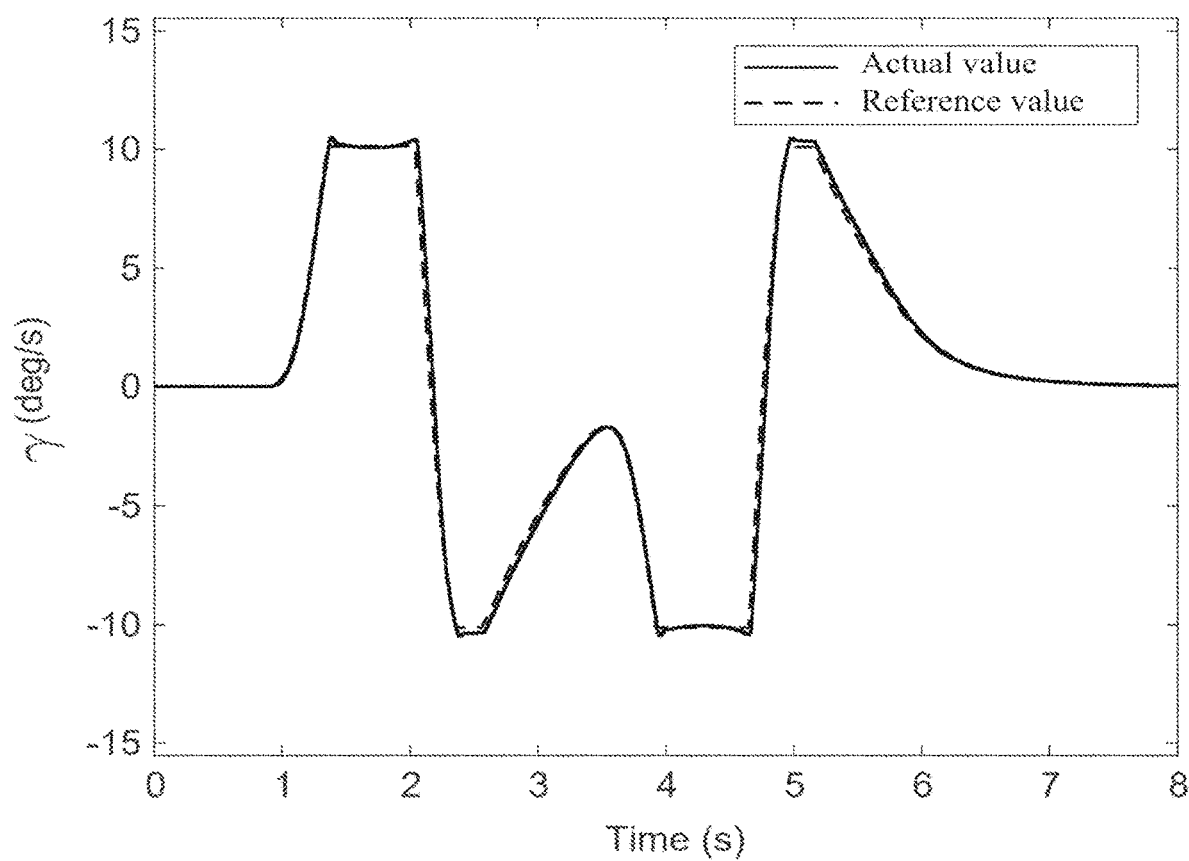
FIG. 5 is a schematic curve diagram of a vehicle yaw rate under a non-linear model predictive control-based additional yaw moment decision method in a simulation process provided in an embodiment of the present disclosure.
Figure 6:
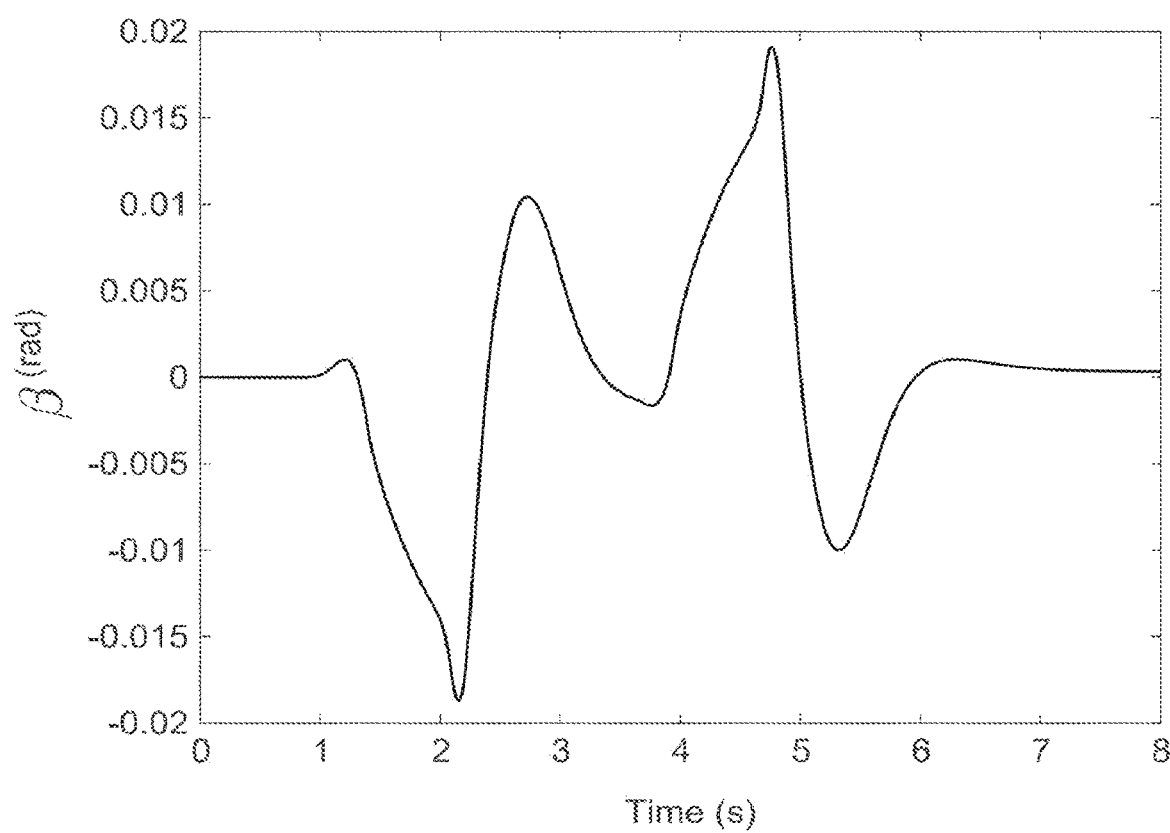
FIG. 6 is a schematic curve diagram of a vehicle sideslip angle under a non-linear model predictive control-based additional yaw moment decision method in a simulation process provided in an embodiment of the present disclosure.
Figure 7:
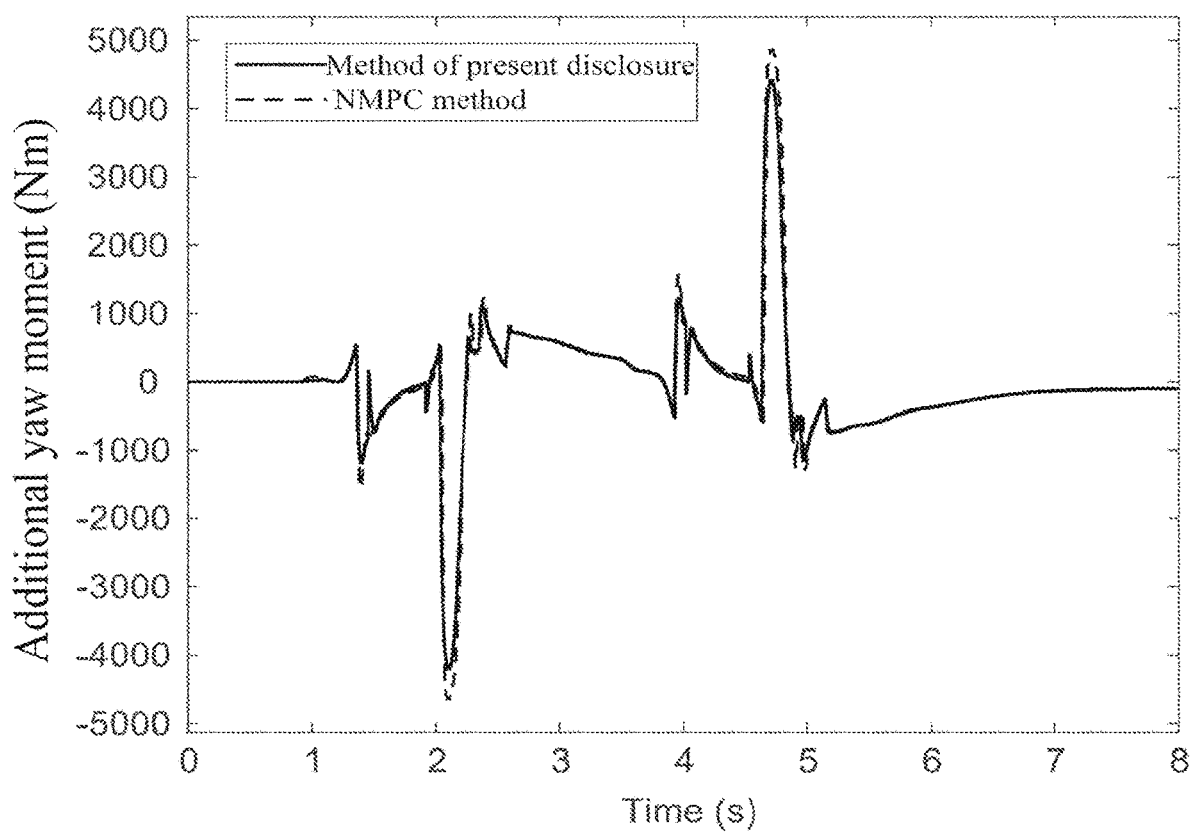
FIG. 7 is a schematic diagram of contrast curves of additional yaw moments decided by two methods provided in an embodiment of the present disclosure.

FIG. 3 shows a tracking curve of the yaw rate obtained by the additional yaw moment real-time optimization decision method according to the present disclosure in the simulation process. It can be seen from analysis of the curve that the additional yaw moment obtained by the method proposed by the present disclosure can effectively ensure the tracking accuracy of the yaw rate after applied to the vehicle. FIG. 4 shows a curve of the sideslip angle obtained by the additional yaw moment real-time optimization decision method according to the present disclosure in the simulation process. It can be seen from analysis of the curve that the additional yaw moment obtained by the method proposed by the present disclosure can effectively suppress the sideslip angle after applied to the vehicle, so as to ensure the driving stability of the vehicle. FIG. 5 and FIG. 6 show a curve of the yaw rate as well as a curve of the sideslip angle obtained by the non-linear model predictive control-based additional yaw moment decision method respectively. Taking FIG. 5 and FIG. 6 as the basis and comparing with FIG. 3 and FIG. 4, it can be found that the additional yaw moment real-time optimization decision method according to the present disclosure is comparable to the non-linear model predictive control method in tracking the desired vehicle yaw rate and suppressing the sideslip angle. FIG. 7 shows curves of additional yaw moments decided by the two methods. It can be seen from analysis of the curves that the additional yaw moments obtained by the two methods are basically the same, which fully proves the effectiveness of the method according to the present disclosure.

Figure 8:
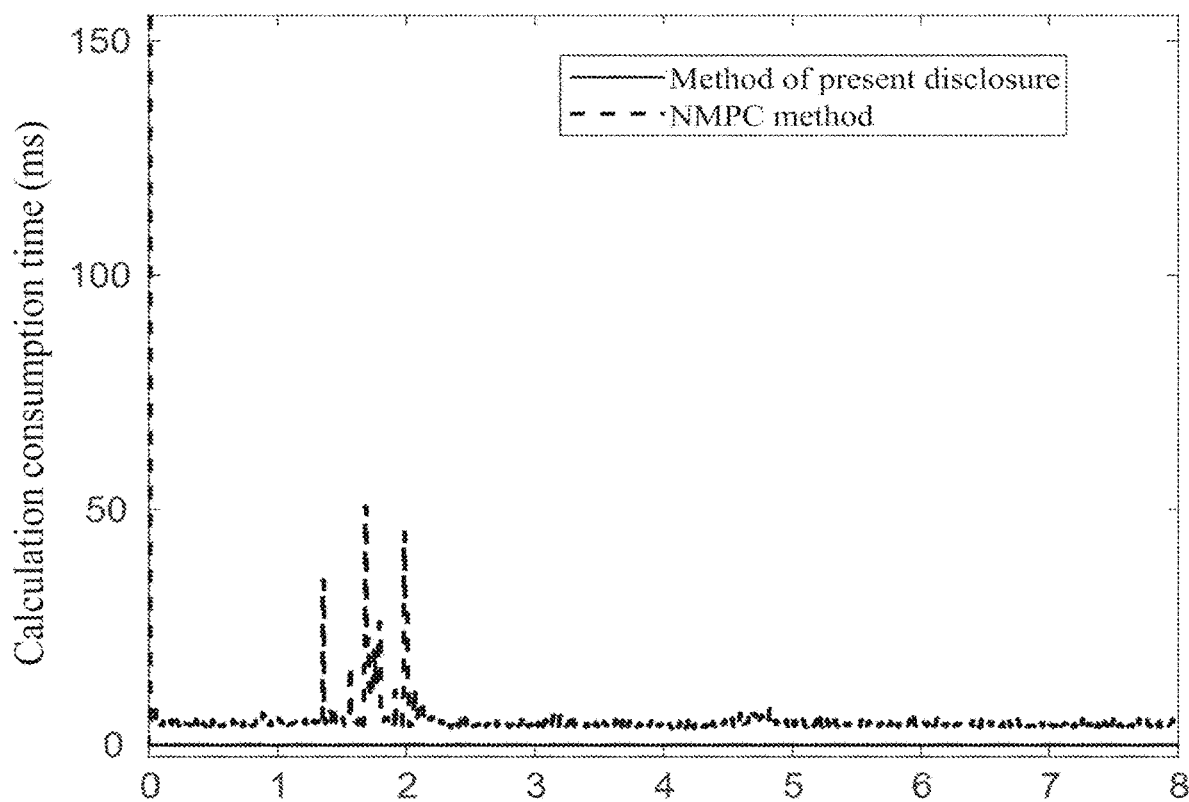
FIG. 8 is a schematic diagram of calculation consumption time of two methods provided in an embodiment of the present disclosure.

FIG. 8 shows a contrast of calculation time of the two methods. The calculation time of the method according to the present disclosure is about 0.05 ms, while the calculation time of the non-linear model predictive control-based additional yaw moment decision method solved by the non-linear solver of Casadi is about 5 ms. Therefore, the method according to the present disclosure can fully meet the requirement for the real-time performance of calculation, and its time required for calculation is much less than that of the non-linear model predictive control algorithm.

Through simulation comparison, the additional yaw moment real-time optimization decision method according to the present disclosure can better control both the tracking of the desired yaw rate and the suppression of the sideslip angle, which is comparable to non-linear model predictive control. Moreover, it can be seen from the contrast results of the calculation time that since the additional yaw moment real-time optimization decision method proposed by the present disclosure results in the explicit expression of the optimal additional yaw moment, it takes a short time to calculate, which can meet the requirement for the real-time performance. To sum up, the method proposed by the present disclosure can effectively achieve all the benefits of the present disclosure.

The foregoing is detailed description of the preferred specific embodiments of the present disclosure. It should be understood that those of ordinary skill in the art can make various modifications and variations according to the concept of the present disclosure without creative efforts. Therefore, all technical solutions that those skilled in the art can obtain based on the prior art through logical analysis, reasoning, or finite experiments according to the concept of the present disclosure shall fall within the protection scope defined by the claims.

What is claimed is:

1. A real-time control method for an additional yaw moment of a distributed drive electric vehicle, comprising the following steps:
acquiring and inputting a real-time motion state of the distributed drive electric vehicle into a pre-constructed vehicle dynamics model, using a yaw rate and a sideslip angle of the distributed drive electric vehicle as tracking targets to suppress actuation energy, and performing optimization calculation on the additional yaw moment to acquire an amount of the additional yaw moment distributed for each tire of the distributed drive electric vehicle; and
transmitting the amount of the additional yaw moment distributed for each tire into a layer controller;
driving each tire of the distributed drive electric vehicle according to the amount of the additional yaw moment distributed for each tire by the layer controller;
wherein, in the optimization calculation process, a linear expression of the sideslip angle with respect to the additional yaw moment and a linear expression of the yaw rate with respect to the additional yaw moment are constructed, so as to perform search calculation on the additional yaw moment;
wherein an expression of the vehicle dynamics model is:

$$\dot{x}_1 = g_1(x)$$

$$\dot{x}_2 = g_2(x) + \frac{\Delta M_{zup}}{I_z \gamma_{up}} u$$

$$x = [x_1, x_2]^T = \left[\frac{\beta}{\beta_{up}}, \frac{\gamma}{\gamma_{up}}\right]^T$$

$$g_1(x) = \frac{F_{yf} + F_{yr}}{mV_x\beta_{up}} - \frac{\gamma_{up}}{\beta_{up}}x_2$$

$$g_2(x) = \frac{L_f F_{yf} - L_r F_{yr}}{I_z \gamma_{up}}$$

wherein $\dot{x}_1$ is a change rate of the sideslip angle, $\dot{x}_2$ is a change rate of the yaw rate, $x_1$ is a normalized sideslip angle, $x_2$ is a normalized yaw rate, both $g_1(x)$ and $g_2(x)$ are intermediate quantities, $\beta_{up}$ is an upper limit value of the sideslip angle, $\gamma_{up}$ is an upper limit value of the yaw rate, $\Delta M_{zup}$ is an upper limit value of the additional yaw moment, $\beta$ represents the sideslip angle, $\gamma$ represents the yaw rate, $F_{yf}$, $F_{yr}$ are lateral forces of front and rear axle tires respectively, m is a weight of the distributed drive electric vehicle, $V_x$ represents a longitudinal velocity, $L_f$, $L_r$ are distances from a mass center of the distributed drive electric vehicle to front and rear axles respectively, and $I_z$ is a rotational inertia of the distributed drive electric vehicle around a Z axis;
wherein an optimization problem of the optimization calculation is:

$$\min J = \frac{1}{2}\Phi_\gamma \|x_2(t+h) - x_{2,ref}\|^2 + \frac{1}{2}\Phi_\beta \|x_1(t+h) - x_{1,ref}\|^2 + \frac{1}{2}\Phi_u \|u\|^2$$

$$\text{s.t. } u_{min} \le u \le u_{max}$$

-continued $$x_{1_{ref}} = \frac{\beta_{ref}}{\beta_{up}} = 0, x_{2_{ref}} = \frac{\gamma_{ref}}{\gamma_{up}}$$

where J is an objective function, $\Phi_\gamma$ is a weight coefficient of the yaw rate, $x_2$ (t+h) is a yaw rate at a time point of t+h, h is a step size, $x_{1_{ref}}$ and $x_{2_{ref}}$ are intermediate quantities, $\Phi_\beta$ is a weight coefficient of the sideslip angle, $\Phi_u$ is a weight coefficient of the additional yaw moment, u is a control input, namely the additional yaw moment, $\beta_{ref}$ is a desired vehicle sideslip angle, $\gamma_{ref}$ is a desired yaw rate, $u_{min}$ is a minimum value of the additional yaw moment, $u_{max}$ is a maximum value of the additional yaw moment, $\beta_{up}$ is an upper limit value of the sideslip angle, and $\gamma_{up}$ is an upper limit value of the yaw rate.

2. The real-time control method for an additional yaw moment of a distributed drive electric vehicle according to claim 1, wherein the linear expression of the sideslip angle with respect to the additional yaw moment is:

$$x_1(t+h) = x_1(t) + hg_1(x) + \frac{h^2}{2}\left[\frac{\partial g_1(x)}{\partial x_1}g_1(x) + \frac{\partial g_1(x)}{\partial x_2}\left(g_2(x) + \frac{\Delta M_{zup}}{I_z\gamma_{up}}u\right)\right]$$

wherein $$\frac{\partial g_1(x)}{\partial x_1}, \frac{\partial g_1(x)}{\partial x_2}$$

are partial derivatives of a function $g_1(x)$ with respect to state of the yaw rate and the sideslip angle respectively, $x_1(t+h)$ is a sideslip angle at a time point of t+h, h is a step size, and $x_1(t)$ is a sideslip angle at a time point of t.

3. The real-time control method for an additional yaw moment of a distributed drive electric vehicle according to claim 1, wherein the linear expression of the yaw rate with respect to the additional yaw moment is:

$$x_2(t+h) = x_2(t) + h\left[g_2(x) + \frac{\Delta M_{zup}}{I_z\gamma_{up}}u\right] \quad (x)$$

wherein $x_2(t+h)$ is a yaw rate at a time point of t+h, h is a step size, and $x_2(t)$ is a yaw rate at a time point of t.

4. The real-time control method for an additional yaw moment of a distributed drive electric vehicle according to claim 1, wherein in the optimization calculation process, the linear expression of the sideslip angle with respect to the additional yaw moment and the linear expression of the yaw rate with respect to the additional yaw moment are substituted into the optimization problem, and a resulting objective function expression is:

$$J = J_1 + J_2 + J_3$$

$$J_1 = \frac{1}{2}\Phi_\gamma\left\|e_2 + hg_2(x) + h\frac{\Delta M_{zup}}{I_z\gamma_{up}}u\right\|^2$$

$$J_2 = \frac{1}{2}\Phi_\beta\left\|x_1(t) + hg_1(x) + \frac{h^2}{2}\left[\frac{\partial g_1(x)}{\partial x_1}g_1(x) + \frac{\partial g_1(x)}{\partial x_2}\left(g_2(x) + \frac{\Delta M_{zup}}{I_z\gamma_{up}}u\right)\right]\right\|^2$$

$$J_3 = \frac{1}{2}\Phi_u\|u\|^2$$

$$e_2 = x_2(t) - x_{2_{ref}}$$

wherein $x_2$ is the yaw rate, $x_1(t)$ is a sideslip angle at a time point of t, and $$\frac{\partial g_1(x)}{\partial x_1}, \frac{\partial g_1(x)}{\partial x_2}$$

are partial derivatives of a function $g_1(x)$ with respect to state of the yaw rate and the sideslip angle respectively.

5. The real-time control method for an additional yaw moment of a distributed drive electric vehicle according to claim 4, wherein in the optimization calculation process, an optimal solution of the additional yaw moment is calculated by solving an extreme point, an extreme point expression of the objective function is:

$$P_1(x)u + P_2(x) + P_3(x) = 0$$

$$P_1(x) = \Phi_\gamma\left(\frac{h\Delta M_{zup}}{I_z\gamma_{up}}\right)^2 + \Phi_\beta\left(\frac{h^2}{2}\frac{\partial g_1(x)}{\partial x_2}\frac{\Delta M_{zup}}{I_z\gamma_{up}}\right)^2 + \Phi_u$$

$$P_2(x) = \Phi_\gamma\frac{h\Delta M_{zup}}{I_z\gamma_{up}}[e_2 + hg_2(x)]$$

$$P_3(x) =$$

$$\Phi_\beta\frac{h^2}{2}\frac{\partial g_1(x)}{\partial x_2}\frac{\Delta M_{zup}}{I_z\gamma_{up}}\left[x_1(t) + hg_1(x) + \frac{h^2}{2}\left[\frac{\partial g_1(x)}{\partial x_1}g_1(x) + \frac{\partial g_1(x)}{\partial x_2}g_2(x)\right]\right]$$

wherein $P_1(x)$, $P_2(x)$ and $P_3(x)$ are all intermediate quantities;

an expression of the solved extreme point is:

$$u = -\frac{P_2(x) + P_3(x)}{P_1(x)}$$

the solved extreme point is inversely normalized to obtain an optimal solution of the additional yaw moment, and a calculation expression of the optimal solution is:

$$u^* = u\Delta M_{zup}$$

wherein $u^*$ is the optimal solution of the additional yaw moment.

6. The real-time control method for an additional yaw moment of a distributed drive electric vehicle according to claim 5, further comprising setting an additional yaw moment range for the optimal solution of the additional yaw moment to obtain an optimal additional yaw moment, wherein the optimal additional yaw moment is used for distribution of the additional yaw moment of each tire, and a calculation expression of the optimal additional yaw moment is:

$$\Delta M_z^* = \begin{cases} \Delta M_{z_{min}}, & u^* \leq \Delta M_{z_{min}} \\ u^* \\ \Delta M_{z_{max}}, & u^* \geq \Delta M_{z_{max}} \end{cases}$$

wherein $\Delta M^*_z$ is the optimal additional yaw moment, $\Delta M_{z_{min}}$ is a minimum value of the additional yaw moment, and $\Delta M_{z_{max}}$ is a maximum value of the additional yaw moment.

7. The real-time control method for an additional yaw moment of a distributed drive electric vehicle according to claim 6, wherein a distribution expression of the amount of the additional yaw moment distributed for each tire is:

$$\Delta T_{fl} = \Delta T_{rl} = -\frac{\Delta M^*_z R_e}{2d}$$

$$\Delta T_{fr} = \Delta T_{rr} = \frac{\Delta M^*_z R_e}{2d}$$

wherein $\Delta T_{fl}$, $\Delta T_{fr}$, $\Delta T_{rl}$ and $\Delta T_{rr}$ are amounts of the additional yaw moment distributed for a front left wheel, a front right wheel, a rear left wheel and a rear right wheel respectively, $R_e$ is a tire rolling radius, and d is a vehicle wheel track.

* * * * *